(12) United States Patent
DeLuca et al.

(10) Patent No.: US 11,182,799 B2
(45) Date of Patent: *Nov. 23, 2021

(54) NETWORK USAGE DETECTION AND PRESENTATION

(71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/843,010

(22) Filed: Apr. 8, 2020

(65) Prior Publication Data

US 2020/0234308 A1    Jul. 23, 2020

Related U.S. Application Data

(63) Continuation of application No. 16/117,049, filed on Aug. 30, 2018, now Pat. No. 10,650,386.

(51) Int. Cl.
*G06Q 30/00* (2012.01)
*G06F 3/0484* (2013.01)
*G06Q 50/00* (2012.01)
*G06F 8/30* (2018.01)
*G06N 20/00* (2019.01)

(52) U.S. Cl.
CPC ....... *G06Q 30/016* (2013.01); *G06F 3/04842* (2013.01); *G06F 8/30* (2013.01); *G06N 20/00* (2019.01); *G06Q 50/01* (2013.01)

(58) Field of Classification Search
None
See application file for complete search history.

(56) References Cited

U.S. PATENT DOCUMENTS 6,169,534 B1 * 1/2001 Raffel .................... G06Q 10/10
                                                  345/473
6,298,478 B1 * 10/2001 Nally ..................... G06F 9/466
                                                  717/170

(Continued)

FOREIGN PATENT DOCUMENTS

CN     107665448 A     2/2018

OTHER PUBLICATIONS

Authors: Anonymous; Ttl: Providing Relevant Advertisements Based on Item-Specific Purchase History; Dec. 14, 2017; Database: ip.com; ip.com No. IPCOM000252029D.

(Continued)

*Primary Examiner* — Ryan D. Coyer
(74) *Attorney, Agent, or Firm* — Schmeiser, Olsen & Watts; Stephanie Carusillo (57) ABSTRACT

A method and system for improving network usage detection and presentation is provided. The method includes detecting and identifying a user accessing specified network content. Objects being viewed by the user via a network are detected and prior associations between the objects and the user are determined. Attributes of the objects with respect to the prior associations are determined and presented via a GUI.

20 Claims, 6 Drawing Sheets

(56) References Cited

U.S. PATENT DOCUMENTS

| | | | | |
|---|---|---|---|---|
| 7,197,474 B1* | 3/2007 | Kitts | .................... | G06Q 30/02 |
| | | | | 705/7.31 |
| 8,645,221 B1* | 2/2014 | Sarma | .................... | G06Q 30/00 |
| | | | | 705/26.1 |
| 2002/0019763 A1* | 2/2002 | Linden | ............... | G06Q 30/0255 |
| | | | | 705/14.53 |
| 2007/0250402 A1* | 10/2007 | Blanchard | .............. | G06Q 30/02 |
| | | | | 705/7.29 |
| 2010/0250336 A1* | 9/2010 | Selinger | ............ | G06Q 30/0643 |
| | | | | 705/26.7 |
| 2010/0268661 A1* | 10/2010 | Levy | .................... | G06Q 30/02 |
| | | | | 705/347 |
| 2014/0180798 A1* | 6/2014 | Bailey | .................. | G06Q 30/06 |
| | | | | 705/14.45 |
| 2014/0180810 A1 | 6/2014 | Boal | | |
| 2014/0358664 A1* | 12/2014 | Wheeler | ............ | G06Q 30/0226 |
| | | | | 705/14.33 |
| 2017/0193586 A1 | 7/2017 | Yuan | | |

OTHER PUBLICATIONS

Friedman, Mark J.; List of IBM Patents or Patent Applications Treated as Related; Apr. 8, 2020; 1 page.
Mell, Peter et al.; "The NIST Definition of Cloud Computing;" National Institute of Standards and Technology; Special Publication 800-145; Sep. 2011; 7 pages.

\* cited by examiner

NETWORK USAGE DETECTION AND PRESENTATION

CROSS REFERENCE TO RELATED APPLICATIONS

This application is a continuation application claiming priority to Ser. No. 16/117,049 filed Aug. 30, 2018, now U.S. Pat. No. 10,650,386 issued May 12, 2020, the contents of which are hereby incorporated by reference.

FIELD

The present invention relates generally to a method for detecting network usage and in particular to a method and associated system for improving hardware and software based network technology associated with presenting network based attributes for improving a network efficiency with respect to network associated presentations.

BACKGROUND

Accurately enabling specified presentations for devices typically includes an inaccurate process with little flexibility. Determining presentation solutions with respect to Web based information may include a complicated process that may be time consuming and require a large amount of resources. Accordingly, there exists a need in the art to overcome at least some of the deficiencies and limitations described herein above.

SUMMARY

A first aspect of the invention provides a network usage detection and presentation improvement method comprising: detecting, by a processor of a hardware device, a user accessing specified network content; identifying, by the processor, the user; detecting, by the processor, objects being viewed by the user via a network associated with the network content; determining, by the processor accessing a database, prior associations between the objects and the user; determining, by the processor, attributes of the objects with respect to the prior associations; and presenting, by the processor to the user via a GUI, the attributes.

A second aspect of the invention provides a computer program product, comprising a computer readable hardware storage device storing a computer readable program code, the computer readable program code comprising an algorithm that when executed by a processor of a hardware device implements a network usage detection and presentation improvement method, the method comprising: detecting, by the processor, a user accessing specified network content; identifying, by the processor, the user; detecting, by the processor, objects being viewed by the user via a network associated with the network content; determining, by the processor accessing a database, prior associations between the objects and the user; determining, by the processor, attributes of the objects with respect to the prior associations; and presenting, by the processor to the user via a GUI, the attributes.

A third aspect of the invention provides a hardware device comprising a processor coupled to a computer-readable memory unit, the memory unit comprising instructions that when executed by the computer processor implements a network usage detection and presentation improvement method comprising: detecting, by the processor, a user accessing specified network content; identifying, by the processor, the user; detecting, by the processor, objects being viewed by the user via a network associated with the network content; determining, by the processor accessing a database, prior associations between the objects and the user; determining, by the processor, attributes of the objects with respect to the prior associations; and presenting, by the processor to the user via a GUI, the attributes.

The present invention advantageously provides a simple method and associated system capable of accurately enabling specified presentations for devices.

DETAILED DESCRIPTION

Figure 1:
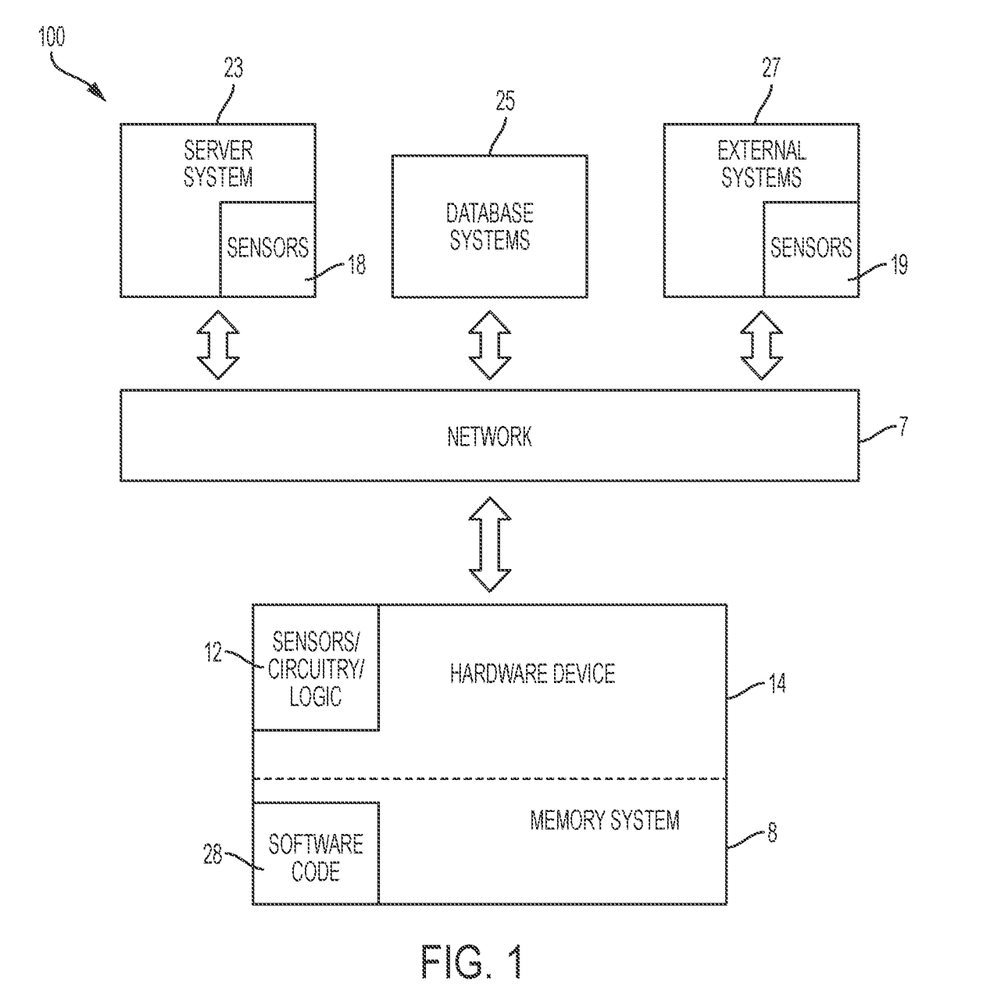
FIG. 1 illustrates a system for improving network technology associated with presenting network based attributes for improving a network efficiency with respect to network associated presentations, in accordance with embodiments of the present invention.

FIG. 1 illustrates a system 100 for improving network technology associated with presenting network based attributes for improving a network efficiency with respect to network associated presentations, in accordance with embodiments of the present invention. System 100 is enabled analyze previous network activity and present associated information with respect to the previous network activity. System 100 enables the following functionality for generating information and transmitting notifications with respect to the previous network activity:

In response to a Website access request, a first size and quantity of a first product purchased (via a Web process) by a user is determined. The first size and quantity is compared to a second size and a quantity of a second product currently selected for purchase (via a Web process) by the user. Results of the comparison indicate that a difference between the first sized and quantity and the second size and quantity exceeds a predetermined threshold value. In response, a notification indicating that the difference exceeds the predetermined threshold value is transmitted to the user. Additionally, a recommended quantity and/or a recommended size of a specified product may be determined based on: an average rate of consumption of the specified product by the user, a shelf life of the specified product, a cost of the specified product at a given size or quantity, and/or an average time between visits of the user to a venue that carries a type associated with the specified product.

System 100 of FIG. 1 includes a server system (or hardware system) 23, database systems 25, and external systems 27 connected through a network 7 to a (mobile) hardware device 14. Hardware device 14 comprises sensors/circuitry/logic 12 and a (specialized) memory system 8 (and a specialized GUI). Memory system 8 comprises software code 28. Memory system 8 may include a single memory system. Alternatively, memory system 8 may include a plurality of memory systems. Server system 23, database systems 25, and external systems 27, and hardware device 14 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server system 23, database systems 25, and external systems 27, and hardware device 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-6. The specialized discrete non-generic analog, digital, and logic based circuitry (e.g., sensors/circuitry/logic 12, sensors 18, sensors 19, etc.) may include proprietary specially designed components (e.g., a specialized integrated circuit, such as for example an Application Specific Integrated Circuit (ASIC) designed for only implementing an automated process for improving network technology associated with presenting network based attributes for improving a network efficiency with respect to network associated presentations. Sensors/circuitry/logic 12, sensors 18, and sensors 19 may include any type of internal or external sensors including, inter alia, GPS sensors, Bluetooth beaconing sensors, cellular telephone detection sensors, Wi-Fi positioning detection sensors, triangulation detection sensors, activity tracking sensors, social network code based sensors, a heart rate monitor, a blood pressure monitor, a temperature sensor, a pulse rate monitor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 enables the following process for presenting comparative information associated with past network activities:

The process is initiated when a user enables a Web process (via a hardware system) for accessing an e-commerce Website. In response, the user is identified via, inter alia, any of the following identification processes: an e-commerce Website credential identification process, a social media account identification process associated with a currently accessed Web browser, browser cookies, etc. Subsequently, the user browses the e-commerce Website for specified objects (e.g., products) and for each object detected, system 100 determines if the user has accessed (e.g., purchased) a similar object via a Web process or via a visit to a structure at a physical location (e.g., a store). If it is determined that the user accessed a similar object then a process for generating comparative information (associated with the object) is initiated. Comparative information may include, inter alia, previous pricing, previous brands purchased, a previous weight, etc. For example, a first user typically purchases 2 pounds of chicken at a local grocery store and therefore when the first user executes an online shopping process, it may be difficult for the first user to determine a quantity of chicken necessary to feed his/her family of 4. Therefore, system 100 may notify the first user that he/she typically purchases 2 pounds of chicken. Alternatively, a difference between a typical amount of an item purchased and a current amount of the item being purchased may be presented to the user. For example, the first user places ¼ pound of chicken in an online cart and during a checkout process, the user is notified that he/she typically purchases 2 pounds of chicken (i.e., a 1¾ pound difference). Additionally, thresholds may be enabled for differing types of terms. For example, if a user recently purchased 1 pound of a product X and he/she is currently viewing (e.g., on a Website) 15 ounces of the product X, system 100 may present messages as follows: "This quantity is 15/16 of your last purchase", "This quantity is about the same as your last purchase", etc. System 100 may further present comparative information based on what a specified Website typically offers. For example, system 100 may present the following message: "The above quantity of product X includes the closest sized item that is available with respect to your purchase history". System 100 may be federated across multiple e-commerce sites such that system 100 may analyze multiple previous transactions.

Figure 2:
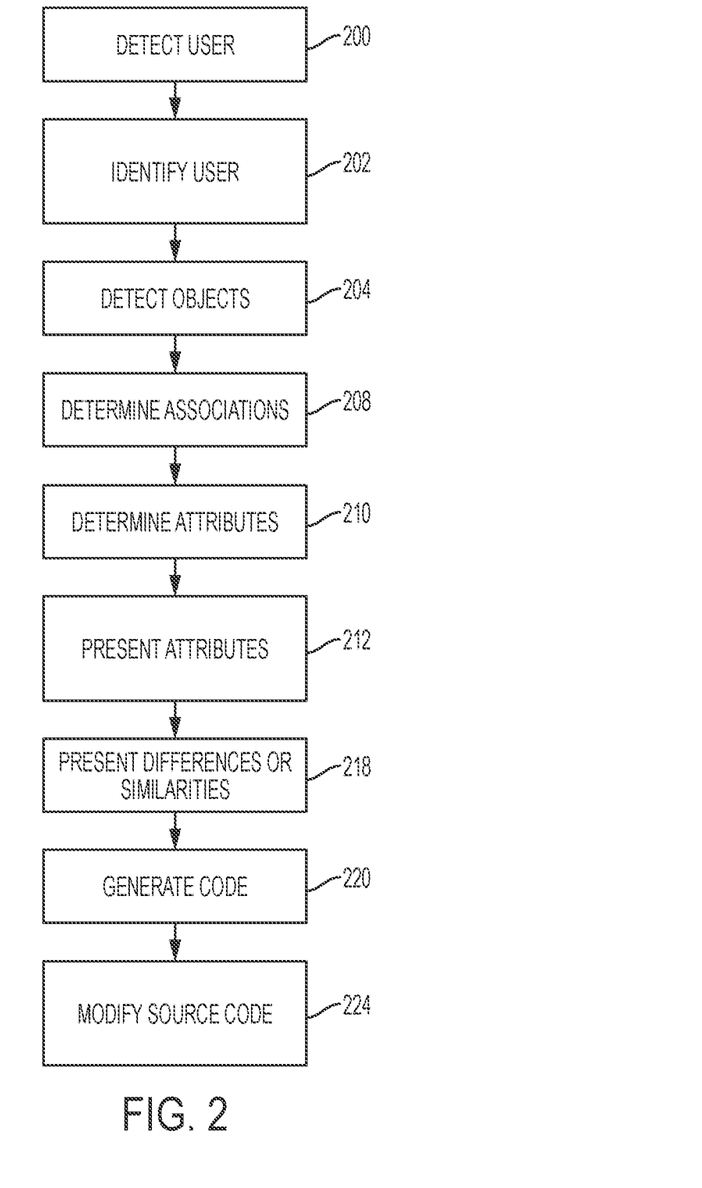
FIG. 2 illustrates an algorithm detailing a process flow enabled by the system of FIG. 1 for improving network technology associated with presenting network based attributes for improving a network efficiency with respect to network associated presentations, in accordance with embodiments of the present invention.

FIG. 2 illustrates an algorithm detailing a process flow enabled by system 100 of FIG. 1 for improving network technology associated with presenting network based attributes for improving a network efficiency with respect to network associated presentations, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server system 23, database systems 25, external systems 27, and hardware device 14. In step 200, a user accessing specified network content is detected. In step 202, the user is identified. The user may be identified by, inter alia, analyzing a user account, analyzing user credentials, analyzing a social media profile, analyzing user biometric data, analyzing browser cookies, etc. In step 204, objects (e.g., items for sale) being viewed by the user via a network associated with the network content are detected. In step 208, prior associations between the objects and the user are determined. Determining the prior associations may include detecting that the user has previously accessed the objects via the network (e.g., detected via sensors 18 of server system 23 of FIG. 1). Alternatively, determining the prior associations may include detecting that the user has previously accessed the objects via a structure associated with a specified geographical location (e.g., detected via sensors 19 of external systems 27 of FIG. 1).

In step 210, attributes of the objects with respect to the prior associations are determined. Attributes may include, inter alia, previous dimensions or weights associated with the objects, previous types associated with the objects, previous pricing with the objects, etc. The attributes may be associated with the prior associations between the objects and the user with respect to a single entity (e.g., a single Website or retail location) or multiple entities associated with the object. In step 212, the attributes are presented to the user via a GUI. The attributes may be presented via, inter alia, highlighting the objects via the GUI. In step 218, differences or similarities between the attributes (of step 210) and current attributes associated with the objects with respect to the user are determined and presented to the user via the GUI. In step 220, self learning software code for executing future presentation processes associated with attributes of the objects with respect to the user is generated. In step 220, the self learning software code is combined with source code of the network resulting in modified source code of the network.

Figure 3:
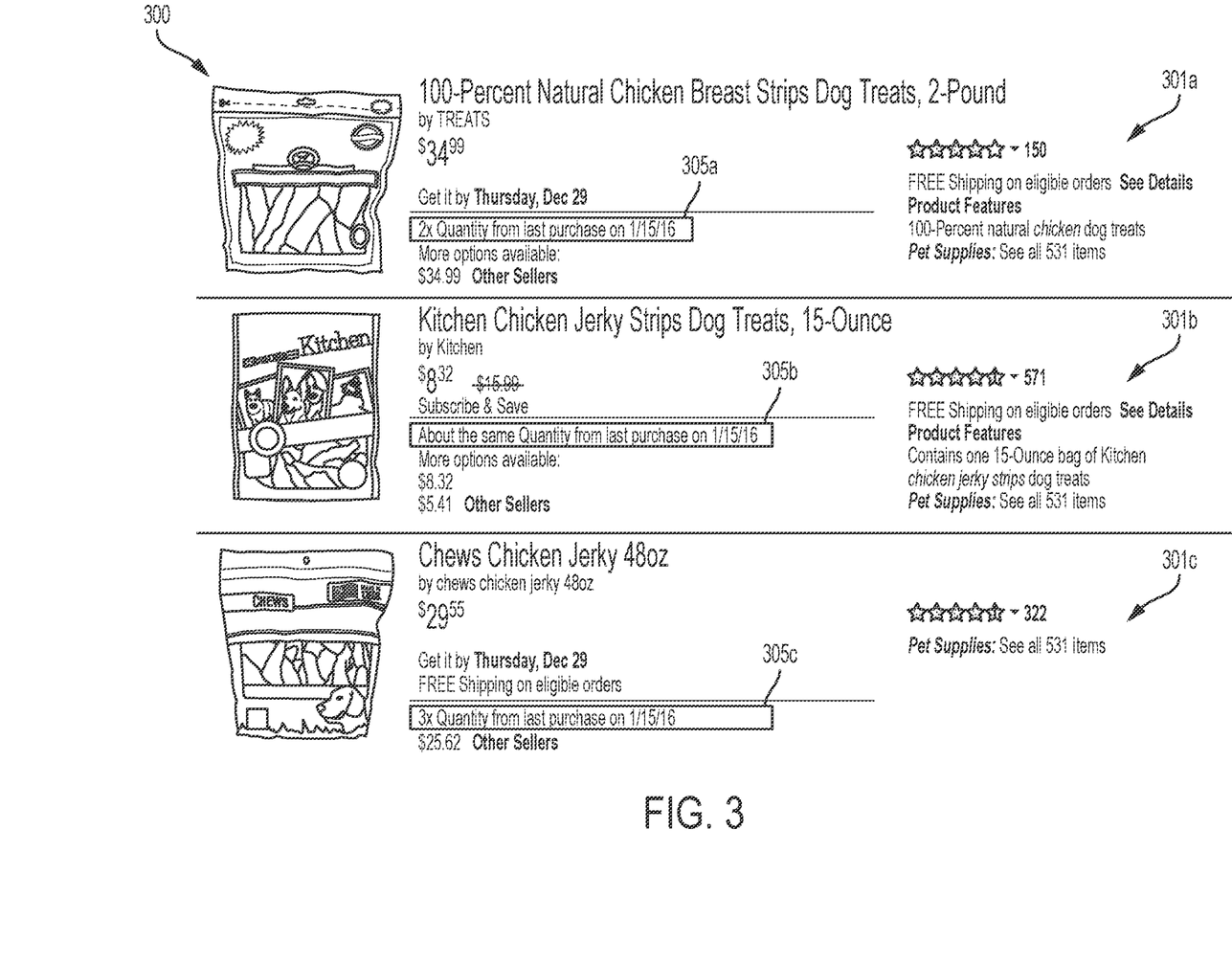
FIG. 3 illustrates an implementation example enabling the system of FIG. 1 for improving graphical user interface (GUI) technology associated with network presentations, in accordance with embodiments of the present invention.

FIG. 3 illustrates an implementation example enabling system 100 of FIG. 1 for improving graphical user interface (GUI) technology associated with network presentations, in accordance with embodiments of the present invention. The example presented in FIG. 3 illustrates a GUI 300 comprising three differing product selections 301a, 301b, and 301c. The example is initiated in response to a user accessing a Website for purchasing his/her pet a new bag of dog treats via the Website. The user enters the following phrase to initiate a search for the dog treats: "chicken strips for dogs". In response, the Website presents product selections 301a, 301b, and 301c. Product selections 301a, 301b, and 301c present descriptions 302a, 302b, and 302c, pricing/arrival dates 304a, 304b, and 304c, and quantity comparisons (with respect to previous purchases) 305a, 305b, and 305c associated (respectively) with product selections 301a, 301b, and 301c. Quantity comparisons 305a, 305b, and 305c are determined by system 100 and presented to the user for improving an online Website based transaction.

Figure 4:
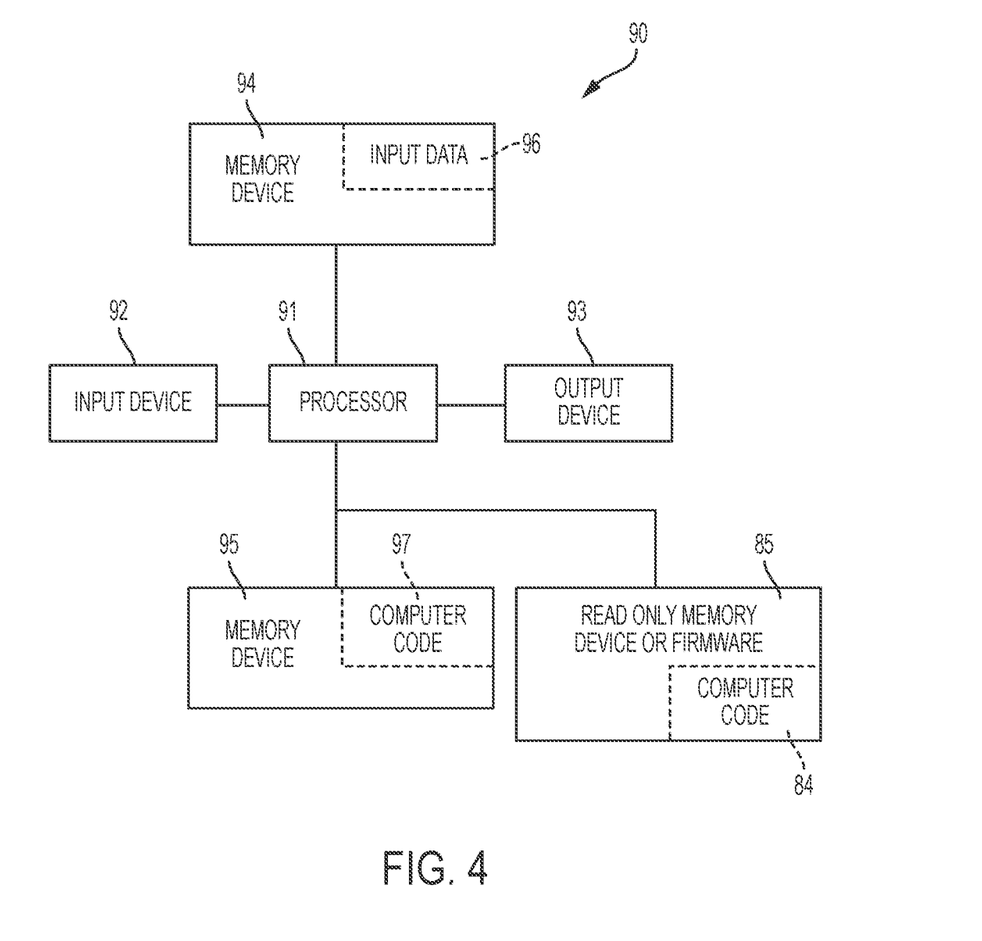
FIG. 4 illustrates a computer system used by the system of FIG. 1 for improving network technology associated with presenting network based attributes for improving a network efficiency with respect to network associated presentations, in accordance with embodiments of the present invention.

FIG. 4 illustrates a computer system 90 (e.g., server system 23, database systems 25, and external systems 27, and hardware device 14 of FIG. 1) used by or comprised by the system of FIG. 1 for improving network technology associated with presenting network based attributes for improving a network efficiency with respect to network associated presentations, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving network technology associated with presenting network based attributes for improving a network efficiency with respect to network associated presentations. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve network technology associated with presenting network based attributes for improving a network efficiency with respect to network associated presentations. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving network technology associated with presenting network based attributes for improving a network efficiency with respect to network associated presentations. In another embodiment, the invention provides a business method that performs the process steps of the invention on a subscription, advertising, and/or fee basis. That is, a service supplier, such as a Solution Integrator, could offer to enable a process for improving network technology associated with presenting network based attributes for improving a network efficiency with respect to network associated presentations. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
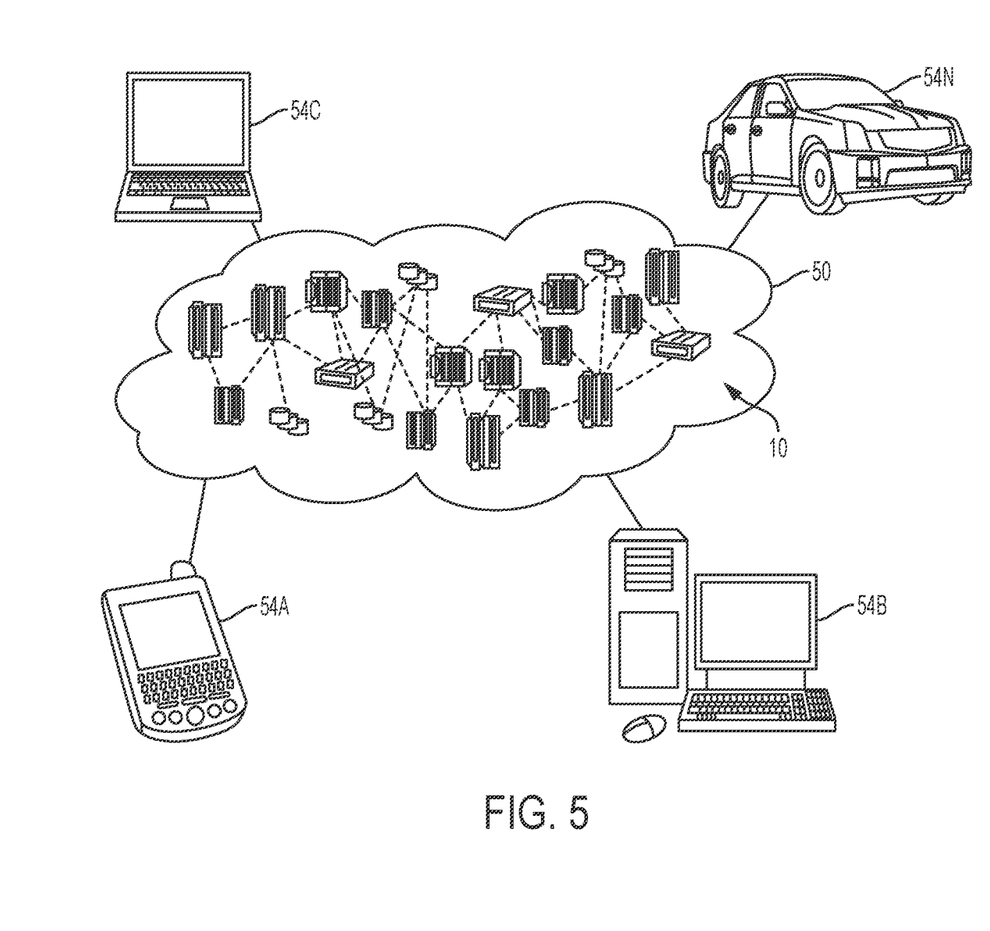
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
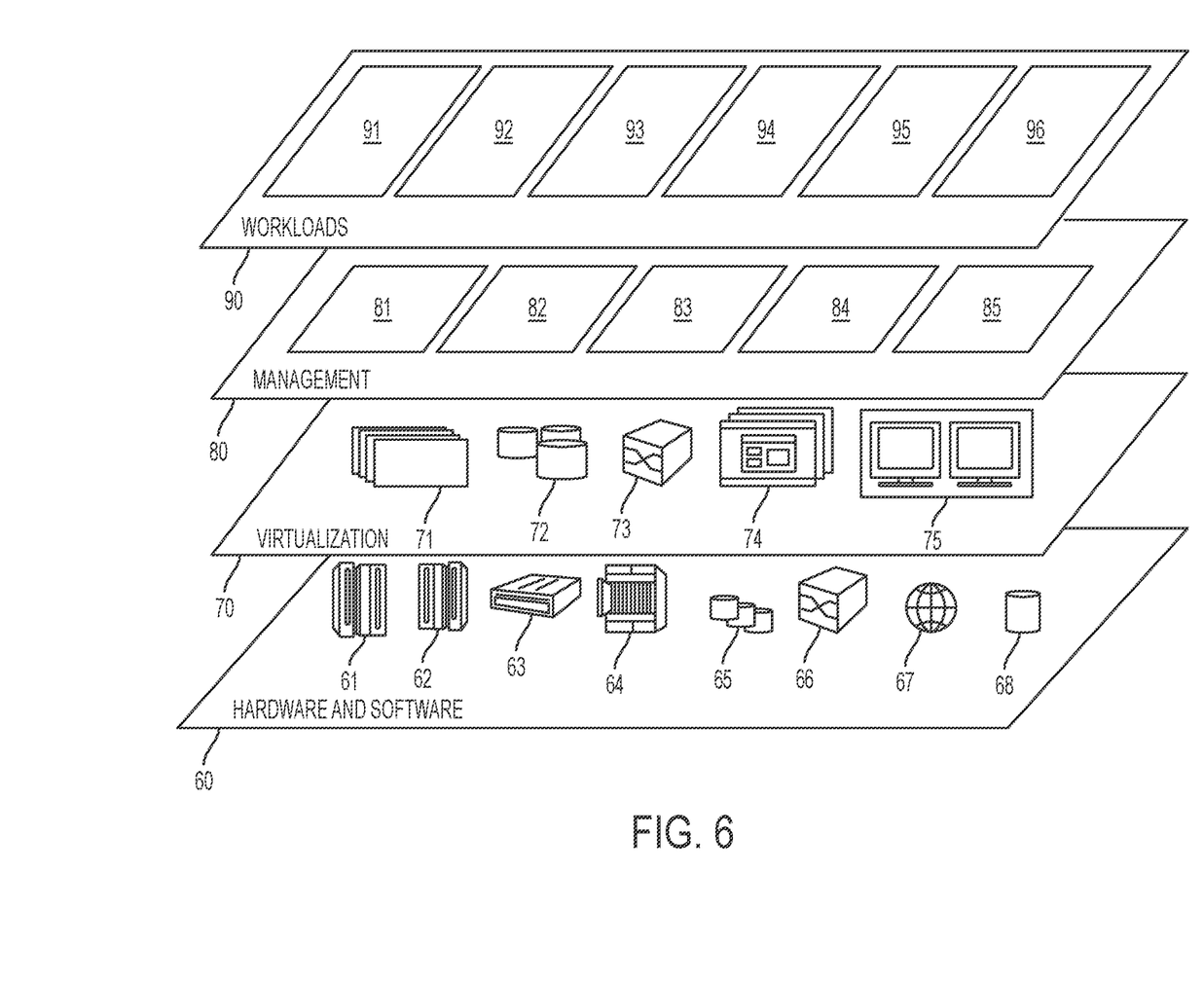
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving network technology associated with presenting network based attributes for improving a network efficiency with respect to network associated presentations 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A network usage detection and presentation improvement method comprising:
    detecting, by a processor of a hardware device, a user accessing specified network content;
    detecting, by said processor, objects being viewed by said user via a network associated with said network content;
    determining, by said processor accessing a database, prior associations between said objects and said user, wherein said determining said prior associations comprises detecting that said user has previously retrieved said objects from a physical structure at a specified geographical location;
    determining, by said processor, attributes of said objects with respect to said prior associations;
    determining, by said processor, differences between said attributes and current attributes associated with said objects with respect to said user;
    determining, by said processor, that said differences exceed a predetermined threshold value; and
    presenting, by said processor to said user via a graphical user interface (GUI), said attributes, an indication that said user has previously retrieved said objects from said physical structure, said differences, and an indication that said differences exceed said predetermined threshold value.

2. The method of claim 1, wherein said identifying comprises analyzing: a user account, user credentials, a social media profile, user biometric data, or browser cookies associated with said user with respect to said network.

3. The method of claim 1, wherein said determining said prior associations comprises detecting that said user has previously accessed said objects via said network.

4. The method of claim 1, wherein said attributes of said objects comprise attributes selected from the group consisting of previous dimensions or weights associated with said objects, previous types associated with said objects, and previous pricing with said objects.

5. The method of claim 1, wherein said presenting comprises highlighting said objects via said GUI.

6. The method of claim 1, further comprising:
    presenting, by said processor to said user via said GUI, similarities between said attributes and current attributes associated with said objects with respect to said user.

7. The method of claim 1, wherein said attributes are associated with said prior associations between said objects and said user with respect to a single entity associated with said objects.

8. The method of claim 1, wherein said attributes are associated with said prior associations between said objects and said user with respect to multiple entities associated with said objects.

9. The method of claim 1, further comprising:
    providing at least one support service for at least one of creating, integrating, hosting, maintaining, and deploying computer-readable code in the hardware device, said code being executed by the computer processor to implement: said detecting said user, said detecting said objects, said determining said prior associations, said determining said attributes, and said presenting.

10. A computer program product, comprising a computer readable hardware storage device storing a computer readable program code, said computer readable program code comprising an algorithm that when executed by a processor of a hardware device implements a network usage detection and presentation improvement method, said method comprising:
    detecting, by said processor, a user accessing specified network content;
    detecting, by said processor, objects being viewed by said user via a network associated with said network content;
    determining, by said processor accessing a database, prior associations between said objects and said user, wherein said determining said prior associations comprises detecting that said user has previously retrieved said objects from a physical structure at a specified geographical location;
    determining, by said processor, attributes of said objects with respect to said prior associations;
    determining, by said processor, differences between said attributes and current attributes associated with said objects with respect to said user;
    determining, by said processor, that said differences exceed a predetermined threshold value; and
    presenting, by said processor to said user via a graphical user interface (GUI), said attributes, an indication that said user has previously retrieved said objects from said physical structure, said differences, and an indication that said differences exceed said predetermined threshold value.

11. The computer program product of claim 10, wherein said identifying comprises analyzing: a user account, user credentials, a social media profile, user biometric data, or browser cookies associated with said user with respect to said network.

12. The computer program product of claim 10, wherein said determining said prior associations comprises detecting that said user has previously accessed said objects via said network.

13. The computer program product of claim 10, wherein said attributes of said objects comprise attributes selected from the group consisting of previous dimensions or weights associated with said objects, previous types associated with said objects, and previous pricing with said objects.

14. The computer program product of claim 10, wherein said presenting comprises highlighting said objects via said GUI.

15. The computer program product of claim 10, wherein said method further comprises:
    presenting, by said processor to said user via said GUI, similarities between said attributes and current attributes associated with said objects with respect to said user.

16. The computer program product of claim 10, wherein said attributes are associated with said prior associations between said objects and said user with respect to a single entity associated with said objects.

17. The computer program product of claim 10, wherein said attributes are associated with said prior associations between said objects and said user with respect to multiple entities associated with said objects.

18. A hardware device comprising a processor coupled to a computer-readable memory unit, said memory unit comprising instructions that when executed by the processor implements a network usage detection and presentation improvement method comprising:
    detecting, by said processor, a user accessing specified network content;
    detecting, by said processor, objects being viewed by said user via a network associated with said network content;
    determining, by said processor accessing a database, prior associations between said objects and said user, wherein said determining said prior associations comprises detecting that said user has previously retrieved said objects from a physical structure at a specified geographical location;
    determining, by said processor, attributes of said objects with respect to said prior associations;
    determining, by said processor, differences between said attributes and current attributes associated with said objects with respect to said user;
    determining, by said processor, that said differences exceed a predetermined threshold value; and
    presenting, by said processor to said user via a graphical user interface (GUI), said attributes, an indication that said user has previously retrieved said objects from said physical structure, said differences, and an indication that said differences exceed said predetermined threshold value.

19. The hardware device of claim 18, wherein said identifying comprises analyzing: a user account, user credentials, a social media profile, user biometric data, or browser cookies associated with said user with respect to said network.

20. The hardware device of claim 18, wherein said determining said prior associations comprises detecting that said user has previously accessed said objects via said network.

* * * * *